Dec. 7, 1937.  K. B. BRITTON  2,101,211
FILTER
Filed Oct. 30, 1934  2 Sheets-Sheet 2
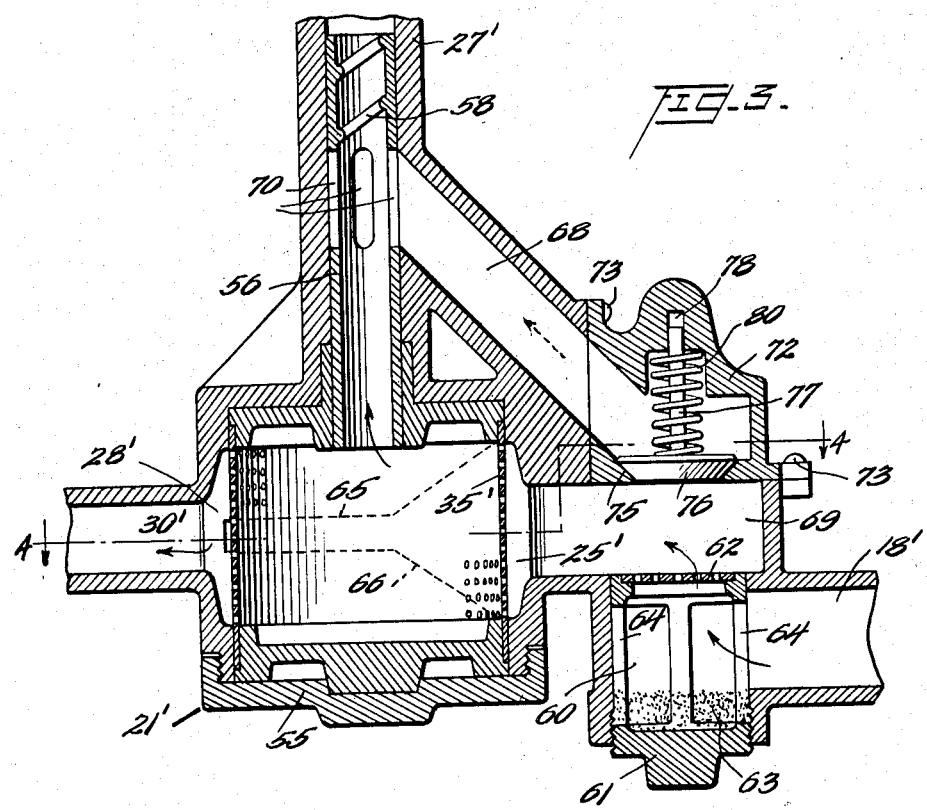
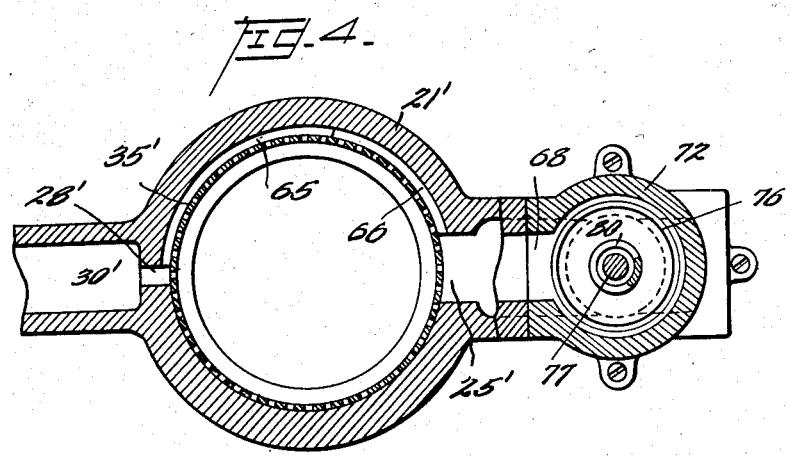
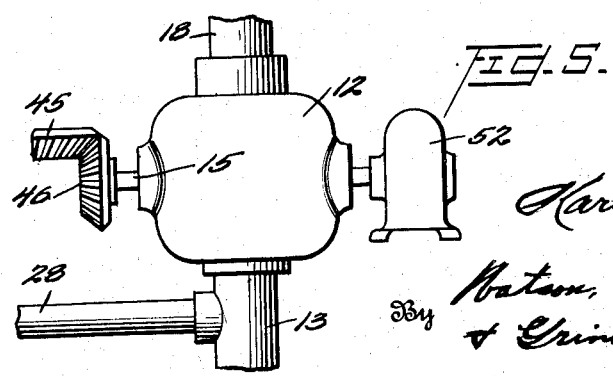
Inventor
Karl B. Britton,
By Watson, Coit, Morse
& Grindle
Attorney Patented Dec. 7, 1937

2,101,211

UNITED STATES PATENT OFFICE 2,101,211

FILTER

Karl B. Britton, Cleveland, Ohio

Application October 30, 1934, Serial No. 750,729

8 Claims. (Cl. 210—167)

This application, which is a continuation in part of my application Serial No. 221,653, filed September 24, 1927, relates to filtering systems and has for its principal object the provision of a novel system and an improved self-cleaning filter.

In filtering systems of the type with which the present invention is concerned, the filter member is cleaned by repassing portions of the filtered fluid through the filtering element in the direction to remove foreign matter deposited thereon from the fluid.

Although this invention is of general application, it has been elected to describe as an example the specific embodiment as applied to the lubricating systems of internal combustion motors. In this specific example, the oil is taken from the crank case, filtered and delivered to the bearings, while a portion of the filtered oil is repassed through the filter to clean the same and is also returned to the crank case.

Other objects and features of novelty will be apparent from the following description taken in connection with the accompanying drawings in which:

Figure 3 is a vertical sectional view of a modified construction;

Figure 4 is a horizontal sectional view taken on line 4—4 of Figure 3; and

Figure 5 is a fragmentary diagrammatic view illustrating certain modifications applied to the construction shown in Figure 1.

Figure 1:
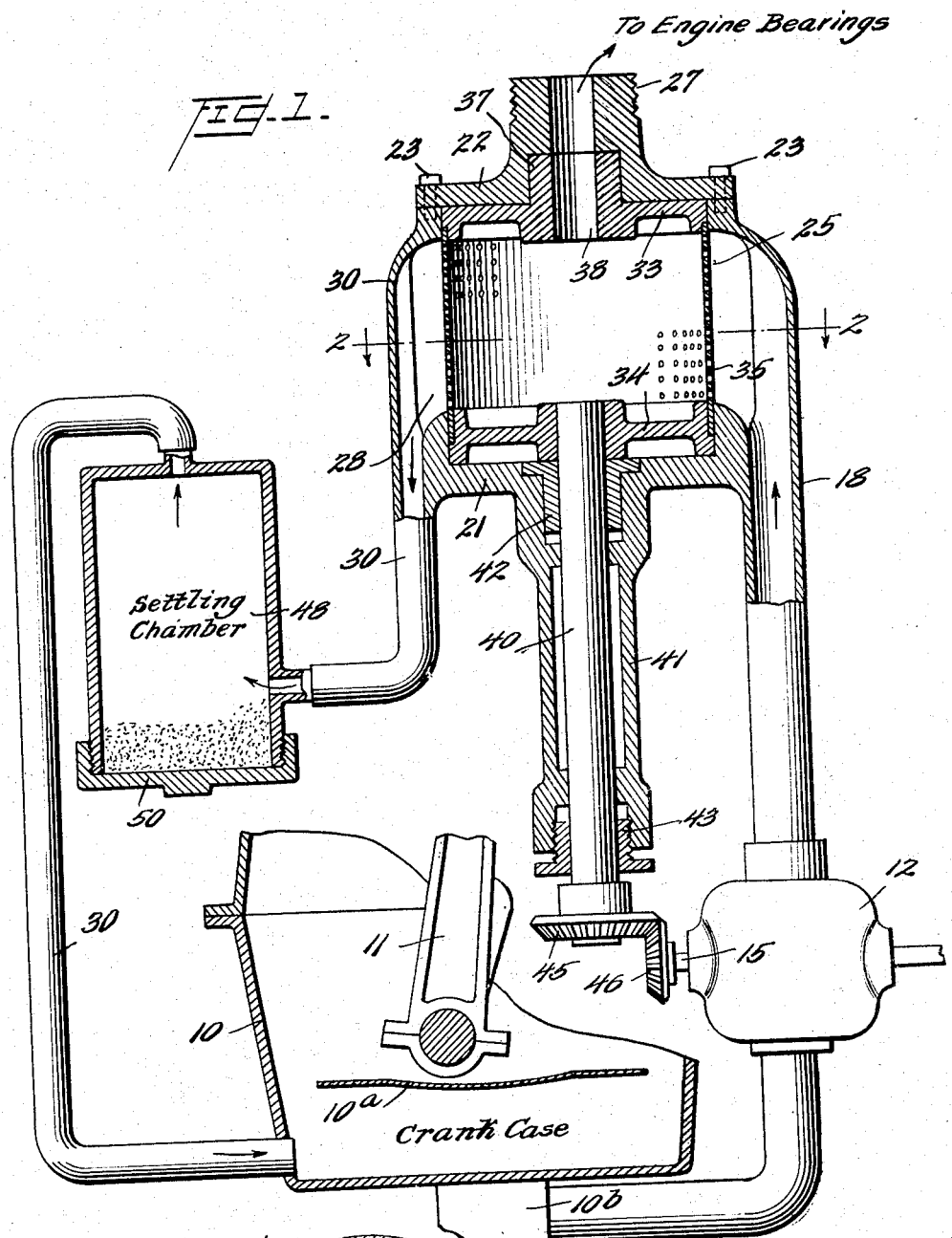
Figure 1 is a somewhat diagrammatic view in vertical cross-section of one embodiment of the invention.

In the form of the invention illustrated in Figure 1 of the drawings, the numeral 10 designates the conventional crank case of an internal combustion motor, a portion of the moving parts of which is indicated at 11, and the false bottom at 10ª. As in the usual arrangement of this character the lubricating oil is pumped from the sump or reservoir 10ᵇ in the crank case and supplied under pressure to the bearings and parts to be lubricated. In the diagrammatic view of Figure 1, the oil pump is indicated at 12 and is arranged to withdraw oil from the crank case 10 through a connection 13. This pump 12 is adapted to be driven by the shaft 15 which may be connected to and actuated by the engine or other source of power in any convenient or suitable manner.

From the pump 12 the oil passes through the conduit 18 to the oil filter. This filter comprises a substantially hollow cylindrical housing including the casing 21 and cover 22 secured thereto by means of the fastening elements 23. As more clearly shown in Figure 2 of the drawings, the housing 21 is provided with an inlet or port 25 which connects the inlet conduit 18 with the interior of the filter. The cover plate 22 is provided with a nipple 27 having the outlet port 38 through which the clear filtered oil passes and which is suitably connected with the parts of the motor to be lubricated.

A second and restricted outlet port 28 connects the interior of the filter and a by-pass conduit 30 leading to the crank case. The cross sectional area of the second outlet is less than that of the inlet port. Within the cylindrical interior chamber of the filter housing is disposed the cylindrical filtering member or element which may, for example, comprise the end disks 33 and 34 which are peripherally rabbeted to receive the annular perforated filter screen 35. This screen may take any desired form such as that of a fine wire mesh or the like.

The disk 33 is provided with a hub 37 which extends within a recess in the cover plate 22 and is formed with a passage that is part of the outlet port 38. In the operation of the apparatus it is intended to effect relative movement of the filter element and the second outlet port 28. This may be continuous, intermittent, rotary or oscillatory. In the form of the invention shown, this relative movement is effected by turning the filter element. For this purpose the disk 34 is provided with an axle or a drive shaft 40 which is carried by the elongated bearing 41 of the casing 21. Stuffing boxes or packing arrangements 42 and 43 are arranged at the upper and lower ends respectively of the shaft and bearing assembly.

On the end of the shaft 40 is a bevel gear 45 which meshes with, and is driven by a bevel gear 46 carried upon one end of the pump shaft 15. Thus the filter element and the oil pump are provided with a common driving means.

From this description, it will be readily understood that during the rotation of the filtering element successive narrow portions of the screen 35 are presented to the oil under pressure in the intake slot 25, the oil passing through the screen into the interior of the filtering element and thence through the outlet passage 38 and nipple 27 to the engine bearings. Similarly, successive portions of the filter screen are presented to the narrower by-pass or filter cleaning slot or port 28. Due to the facts that the oil to be filtered is supplied under pressure by the pump 12, that the engine bearings provide a back pressure upon the supply of clear oil furnished thereto, and that the outlet passage 38 is of less cross-sectional area than the inlet slot 25, a portion of the filtered oil from the interior of the filter element will be forced through the narrow portions of the clogged screen which are presented to the outlet slot 28. In this way a relatively small portion of the filtered oil is employed to clean the filter by the back-washing process. This filter washing oil, together with the foreign particles or sludge which it carries from the filter, passes through a by-pass conduit 30 back to the crank case 10 of the engine. There is preferably interposed in the by-pass conduit 30 a settling chamber 48, into the lower portion of which may be introduced the by-pass oil containing the sludge and the foreign material. This solid matter settles at the bottom of the chamber 48 and may be periodically eliminated by the removal of the screw cap or removable bottom 50. The relatively clear oil is decanted from the upper portion of the settling chamber 48 through the further section of the by-pass conduit 30 and passed to the crank case.

Summarizing the operation of the device, the unfiltered fluid passes through the conduit 18 and the wide inlet slot 25, and because of the differences in pressures, the fluid is forced through the screen 35 and foreign material which cannot find its way through the meshes of the filtering element is deposited on the outside surface thereof. Due to the differences in pressures between the interior of the filter and the port 28 which connects with the crank case which is, of course, at substantially atmospheric pressure, a portion of the filtered fluid passes through the successive portions of the screen 35 which are presented to the port 28 in a direction opposite to that in which the oil passes when depositing the foreign substances in the inlet slot 25. Since the filter member is turned relative to the port 28, it will be apparent that there will continually be presented new portions of the filtering screen 35 in front of the slot 28 and therefore the removal of the deposited material from the filtering screen will be complete. The amount of fluid which is required for the cleaning operation is but a small proportion of the fluid which is pumped, cleaned, and delivered through the exit 38 and this proportion may be regulated in accordance with any given conditions.

In Figure 5 there is illustrated an alternative form of filtering system in which a separate motor 52 of any suitable type may be employed to drive the shaft 15 and in which the by-pass conduit 30 returns the back-washing oil directly to the intake conduit 13 which leads from the sump of the engine to the pump 12. In either of the cases described, the fluid which is carried back through the conduits 30 to the main circulatory system may not be entirely clear or clean, but this is of no great consequence since the fluid is returned to the system at a point in advance of the filter and thus only the clear filtered fluid will be supplied to the working parts of the machine.

In Figures 3 and 4, there is illustrated an embodiment of my invention which includes the provision of certain additional filtering or straining devices, a safety by-pass arrangement, means for rotating the filtering element by the flow of the fluid passed therethrough, and certain other modifications which will now be described. In this embodiment the filter housing is indicated generally by the numeral 21' and is provided with the inlet conduit 18' through which the fluid to be filtered is supplied. An outlet sleeve 27' for the filtered oil and a by-pass conduit 30 for the removed sludge and cleaning oil is also provided and disposed in positions corresponding to those of the similar elements in the previously described arrangement. A filter member 35' is rotatably disposed within the filter chamber and is retained therein by means of the removable bottom cap or plate 55. Although this member may be turned in any suitable manner, it is shown as provided with a tubular outlet extension 56 which extends into the nipple 27' of the housing. Upon the inner wall of this tubular member 56 near its upper end is provided a spiral rib 58 which is acted upon by the oil flowing through the filter to induce the rotation of the tube 56 and thus of the filter member 35'.

In the inlet conduit 18' there may be provided a chamber 60. A removable hollow plug 61 is threaded into the bottom of this chamber and is provided at its upper end with a relatively coarse screen 62 which is adapted to screen out the coarser foreign particles which will settle on the hollow plug 61 as indicated at 63. Slots 64 are provided in the walls of the plug 61 for the admission of fluid from the conduit 18'. A by-pass or filter cleaning port or slot 28' is provided leading into the outlet by-pass 30' as in the other example described.

As previously stated, in filters of this type there is relative movement between the filtering medium and the part having the outlet or port for the fluid that effects the cleaning. Where the screen rotates, it must be so mounted within the housings as to provide only the requisite clearance for efficient rotation; otherwise unfiltered material would find its way between the screen 35 and the interior wall of the housing 21. In this example, however, there is provided means for permitting particles of slightly greater diameter than the width of the clearance space between the wall of the housing 21' and the filtering member 35' to pass around the filter and into the by-pass or back-washing slot 28'. This means comprises the groove 65 which is flared as at 66 at its intake end to register with the side wall of the intake slot 25'. The depth of this groove is, of course, very slight and may be made just sufficient to permit particles of the size to be encountered in the filtering system to find their way around the screen to the discharge slot 30' without substantially changing the pressure relations upon the several inner and outer sides of the filter element.

In the embodiment illustrated in Figures 3 and 4, there is provided in the housing 21' a safety by-pass conduit 68 which leads from the chamber portion 69 at the inlet side of the filter to the tubular outlet element 56 which is provided with slots 70 for admission of the by-passed fluid. The by-pass conduit 68 is formed in a separable portion of the housing 21 which is designated 72. This portion is secured to the main casing member by means of the bolts or other fastening elements 73 and is provided with a valve seat 75 adapted to be normally closed by the spring pressed valve body 76. The valve stem 77 is received within a recess 78 in the casing portion 72 and the spring 80 may be of variable or adjustable tension. Should the filter become clogged or fail to function properly, the pressure which builds up in the inlet portions of the device may be relieved and the unfiltered oil by-passed through the conduit 68 into the outlet connections 56, 27'. The flow of fluid will cooperate with the ribs 58, thus continuing to turn the screen, so that the cleaning action will proceed and finally permit flow in the normal path.

Figure 2:
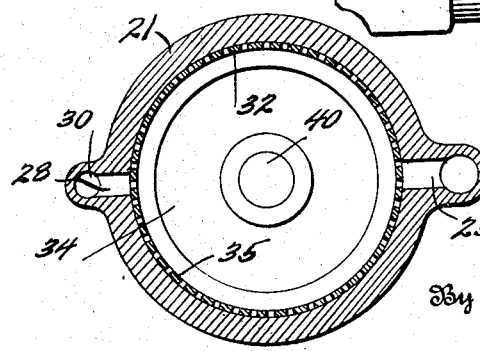
Figure 2 is a horizontal sectional view taken on line 2—2 of Figure 1.

It will be readily understood that any or all of the features illustrated in Figures 3 and 4 may be incorporated in the embodiment shown in Figures 1 and 2 and that various other changes may be made in the preferred embodiment disclosed without departing from the scope of the invention as defined in the following claims.

Having thus described the invention, what is claimed as new and desired to be secured by Letters Patent is:

1. In apparatus of the character described, the combination of a housing, a filtering medium therein, means for relatively moving the said filtering medium and housing, an inlet for delivering fluid upon successive portions of the filtering medium as relative movement occurs, said housing having a discharge outlet for the filtered fluid, a valve controlled by-pass between the said inlet and the said discharge outlet, means between said inlet and said by-pass for separating out foreign material, said housing being provided with a by-pass outlet for discharging restricted amounts of fluid which has already been filtered through the said filtering medium in a direction to remove material which has previously been deposited thereon.

2. In apparatus of the character described, the combination of an annular housing, an annular filter member rotatably mounted within said housing, said housing being provided with an inlet for delivering fluid upon successive portions of the filter member as it is moved, a discharge outlet for the filtered fluid, said discharge outlet comprising a tubular member attached to the rotatable filter member, said tubular member being provided with a spiral screw portion whereby the flowing fluid will react against the screw portion to cause rotation of the filtering member, said housing having a by-pass outlet of restricted area whereby portions of filtered fluid may be discharged through the filter member in a direction to remove material which had been previously deposited thereon.

3. In a filter of the class described, in combination, a housing having inlet and outlet openings, a hollow filtering element mounted for rotation within said housing, a fluid conducting member communicating with the interior of said element and connected thereto for rotation therewith, means associated with said conducting member adapted to be actuated by the flow of fluid through said member to rotate said member and consequently said filtering element.

4. In apparatus of the character described, the combination of a cylindrical housing, a rotatable filter member mounted in said housing, said housing being provided with an inlet opening and said housing being provided with a by-pass outlet of restricted opening, the wall of said housing being provided with a groove extending from adjacent the inlet to the by-pass outlet opening, said housing having a discharge outlet for filtered fluid, and means for rotating the filter member.

5. In apparatus of the character described, the combination of a housing, an annular filter member mounted in said housing for turning movement, said apparatus being provided with an inlet port and a by-pass outlet port of restricted opening, the wall of said housing being provided with a groove extending from the inlet to the by-pass outlet, said housing having an outlet port for filtered fluid, and means for turning the filter member.

6. In apparatus of the character described, the combination of a housing, a filtering medium in said housing, means for relatively moving the housing and the filtering medium, said housing having an inlet, means for delivering the fluid to be filtered under pressure to said inlet, said housing having a by-pass outlet of restricted area for discharging a portion of the filtered fluid through the filtering medium in a direction to remove material previously deposited thereon, a settling chamber with which said by-pass outlet is connected, and means connecting the upper portion of said settling chamber with the means from which unfiltered fluid is supplied to the said inlet.

7. In apparatus of the character described, the combination of a housing, a filtering medium in said housing, said apparatus having an inlet port, means for delivering fluid to be filtered to said inlet, said apparatus having a by-pass outlet port of restricted area for receiving portions of the filtered fluid re-passed through the filtering medium in a direction to remove material previously deposited thereon, a settling chamber with which said by-pass outlet is connected, means providing communication between the upper portion of said settling chamber and the source of supply of unfiltered fluid.

8. The method of filtering foreign matter from fluid which consists in discharging fluid to be cleaned through a filtering medium whereby the foreign material is deposited on the filtering medium, discharging portions of the filtered fluid now acting as a cleaning fluid through successive portions of the filtering medium in a direction to remove the deposited material from the filter, separating said foreign material from said cleaning fluid and combining said cleaning fluid with other fluid of the process.

KARL B. BRITTON.